Dec. 23, 1952 J. L. SOLOMON 2,623,204
CONTROL CIRCUIT FOR THREE-PHASE WELDERS
Filed Feb. 12, 1949 3 Sheets-Sheet 1
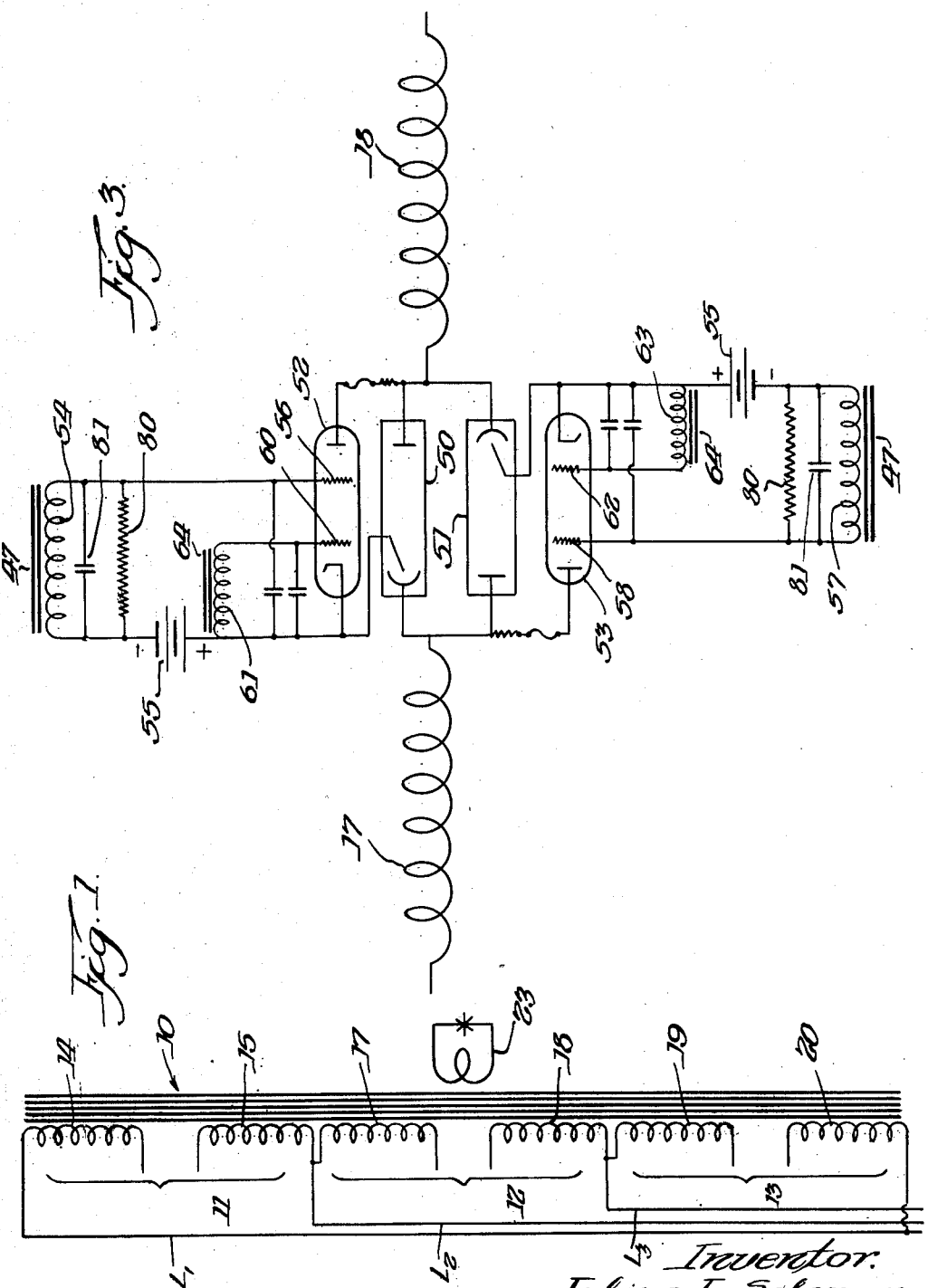
Inventor:
Julius L. Solomon.

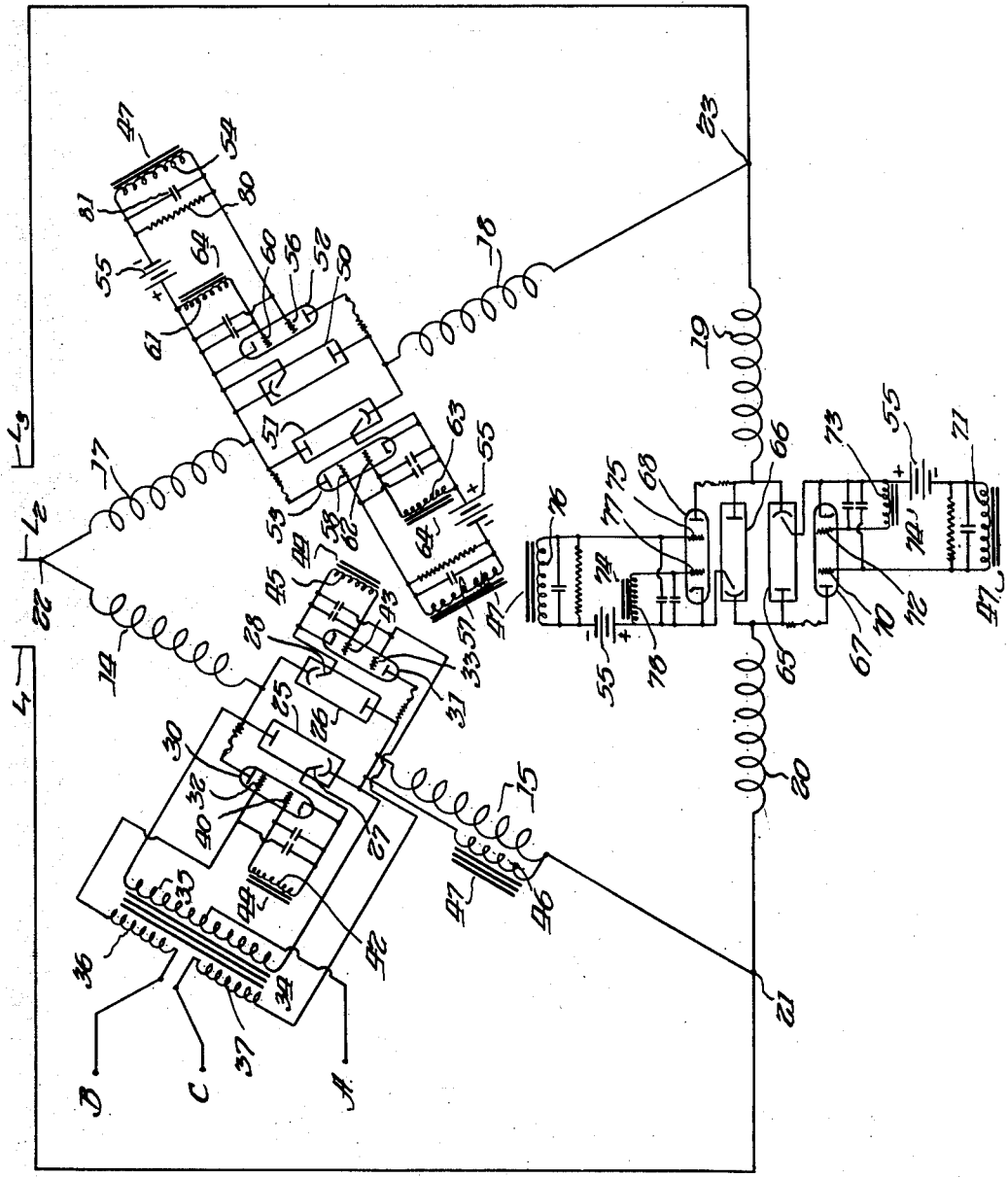

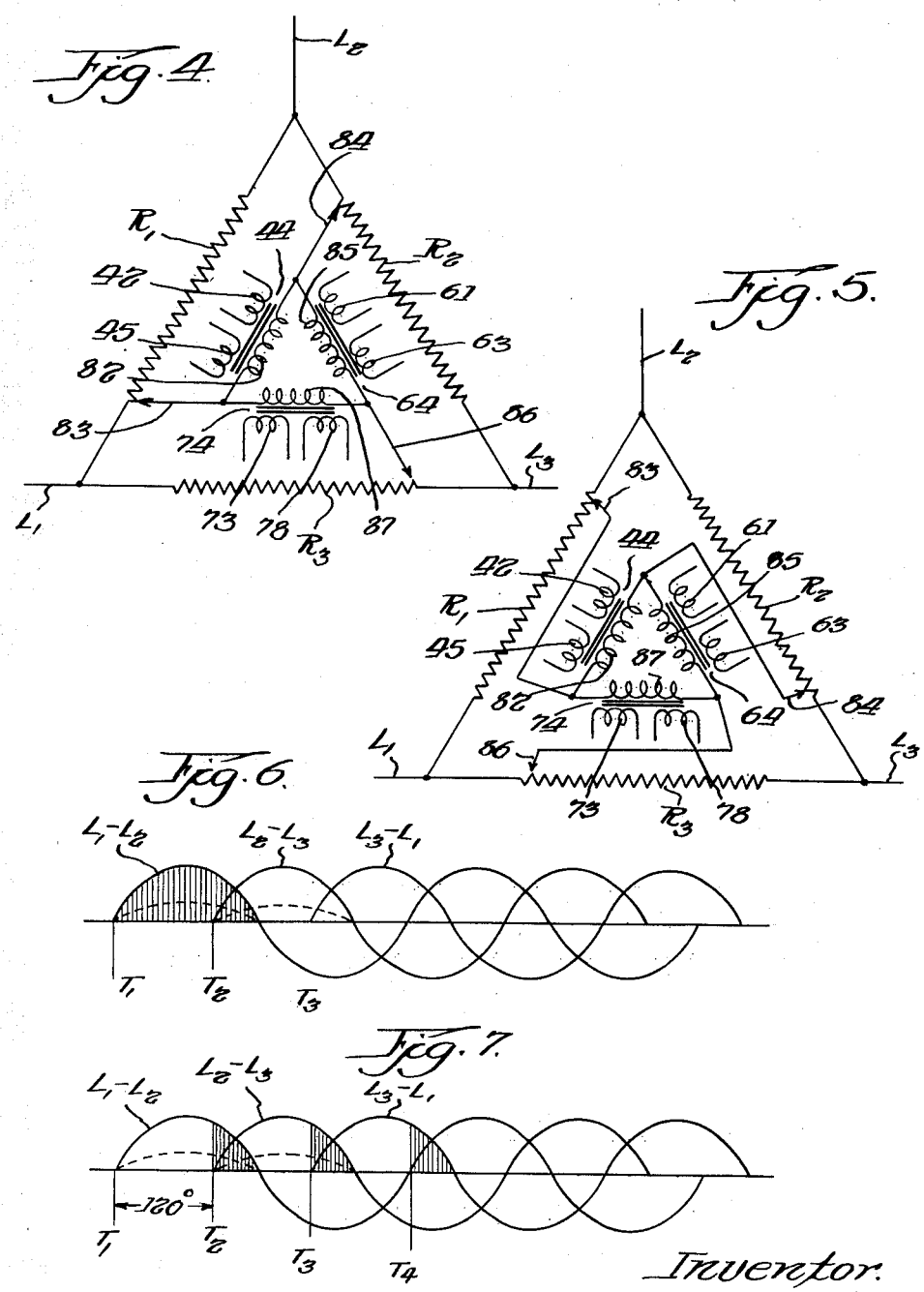

Patented Dec. 23, 1952

2,623,204

UNITED STATES PATENT OFFICE 2,623,204

CONTROL CIRCUIT FOR THREE-PHASE WELDERS

Julius L. Solomon, Chicago, Ill., assignor to Welding Research, Inc., Chicago, Ill., a corporation of Illinois Application February 12, 1949, Serial No. 75,986

7 Claims. (Cl. 323—24)

The invention relates to control circuits and has reference more particularly to a control circuit of the electronic type for supplying current from a polyphase alternating source to respective circuit means in a manner as predetermined by a timer.

The Sciaky Patent No. 2,431,083 granted November 18, 1947, discloses and claims an electric translating system for transferring energy from a polyphase alternating source to a load circuit such as a welding circuit, and where any one of three types of power may be secured in the welding circuit such as a single impulse of unidirectional current, a series of such unidirectional current impulses of the same polarity, or a series of current impulses, each impulse being opposite in polarity to the one immediately preceding it and so comprising a form of single phase alternating current. More particularly the three phase-three winding system of said patent employs reactance means in the form of primary windings in inductive relation with a secondary load circuit and wherein each primary winding has individual circuit connections to its respective phase of the polyphase source of supply with electric discharge valves of the ignition type being provided for controlling the rectified current supplied to the windings respectively.

Accordingly an object of this invention is to provide an ignition circuit of novel design for firing the ignitron tubes in a three winding system of the type as herein described.

Another object of this invention is to provide a firing circuit for a three phase-three winding system as described which will render individual groups of electric discharge valves conductive in a manner as predetermined by a sequencing timer and which circuit will be efficient and positive in operation and economical to manufacture.

A more specific object of the invention is to provide a circuit arrangement designed and adapted for a three winding system and which will control two groups of ignitron tubes so that current from each phase of the polyphase source will be passed by said tubes in a predetermined manner and supplied to respective windings and wherein said circuit means will be so constructed and arranged that the action of one tube of a group in being rendered conductive or nonconductive will result in similar action as regards the other tubes of that group.

Another object of the invention is to provide a control circuit for a multiple winding system as herein described whereby the conductivity of two groups of ignitron tubes can be controlled so as to alternately pass current to the primary windings of the welding transformer for preset intervals with controllable periods of off-time between each succeeding energization of the windings.

Another object of the invention is to provide an electronic circuit which will include circuit means of novel design for each pair of inversely connected ignitron tubes and wherein the said circuit means for the various pairs of ignitron tubes are inductively connected.

Another object is to provide a novel phase shifting device for the control circuit of the invention whereby the control voltage for firing the valves can be phase shifted with respect to the voltage appearing across the particular phase to which the valves are electrically connected.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1 is a diagram illustrating in schematic form a welding transformer of the type shown in the Sciaky Patent No. 2,431,083 and which is representative of the three phase-three winding system to which the present control circuit has application;

Figure 2 is a wiring diagram of a three phase-three winding system such as shown in Figure 1, illustrating the electronic elements and circuit connections of the invention for controlling the firing of the ignitron tubes;

Figure 3 is a fragmentary wiring diagram showing one of the primary windings with its circuit means in electrical connection therewith;

Figure 4 is a schematic diagram illustrating a phase shifting circuit for use in the present invention;

Figure 5 is a view similar to Figure 4 showing the device of Figure 4 in a phase shifted position; and Figures 6 and 7 are diagrammatic illustrations of the alternating voltages in a conventional three phase system and illustrating the delayed firing obtained by the phase shifting device when rotated from its position of Figure 4.

Referring more particularly to Figures 1 and 2, the invention is illustrated as applied to a power system of the three phase-three winding type and which is on the order of a converter system since conventional three phase alternating current is converted to a single phase low frequency current. A characteristic of such a system resides in the use of an inductive device such as a transformer having a plurality of primary windings and a secondary winding. As disclosed the inductive device has three primary windings and which are each individually connected to a phase of the three phase source of supply. As shown in Figure 1 the leads $L_1$, $L_2$ and $L_3$ represent the conductors of the three phase alternating current supply line and it will be seen that the transformer generally indicated by numeral 10 is provided with primary windings 11, 12 and 13, winding 11 have connection to conductors $L_1$—$L_2$, winding 12 having connection to conductors $L_2$—$L_3$, and winding 13 having connection to conductors $L_3$—$L_1$. Each primary winding may comprise a number of windings connected in series and for illustrative purposes two such windings have been shown with one on each side of a pair of inversely connected ignitrons comprising control means which control the flow of current through its respective primary winding. The secondary or load circuit of the transformer 10 is indicated by numeral 23, it being understood that the load circuit has inductive relation with the primary windings 11, 12 and 13.

In operation of the system disclosed, the control means for the various windings perform a controlling function so that a positive or negative half cycle of alternating current is supplied to the windings in sequence according to the phase relation of the electromotive forces in the three phase supply line. For example, one of the discharge valves in the form of ignitrons controlling the flow of current in primary winding 11 is rendered conductive so that a half cycle of current from phase $L_1$—$L_2$ is supplied to said winding. Before the magnetizing effect of the flow of this current through the winding dies out the phase relation of the electromotive forces in the three phase supply is such that a half cycle of current from phase $L_2$—$L_3$ is supplied to winding 12, one of the ignitrons controlling this winding having been rendered conductive in sequence for the purpose. Likewise one of the ignitrons for winding 13 is next rendered conductive and a half cycle of current from phase $L_3$—$L_1$ is caused to flow through this winding. Operation of the control means can be continued in this manner so that the magnetizing current pulses will flow in the same direction through the primary windings until the rise in the magnetic flux reaches a predetermined maximum, at which time the group of three ignitrons are rendered non-conductive. The rise in the magnetic flux has the effect of inducing a unidirectional current in the secondary circuit 23 and which is a pulsating current of increasing magnitude. In order for the magnetic flux to rise in a steady manner the current flow through the windings must be controlled by electric discharge valves which rectify the currents of the respective phases so that they have a unidirectional flow. Thus each magnetizing current pulse will flow through its primary winding in a direction to augment the magnetic flux and one impulse of unidirectional current is induced in the secondary circuit 23, the same comprising the combined output of the phases of the polyphase supply for that particular energization.

The control circuit of the invention is designed to regulate the firing of the various ignitrons and to maintain them conductive for the desired magnetizing period. It is required that such a control circuit render sets or groups of ignitrons alternately conductive so that the direction of current flow through the windings can be reversed for each energization to generate a low frequency alternating current in the secondary load circuit. This is accomplished by the control circuit of the invention wherein a timer renders the ignitrons of one winding conductive in a predetermined manner and inductively related circuits are provided for the ignitrons of the other windings so that their conduction follows that of the lead ignitrons and they accordingly fire in sequence as determined by the phase relation of the electromotive forces in the supply line.

The lead $L_1$ of the three phase power supply is connected to the terminal 21, whereas lead $L_2$ is connected to terminal 22 and $L_3$ to terminal 23. The primary winding 11 consisting of the windings 14 and 15 is connected between terminals 21 and 22. The primary winding 12 consisting of windings 17 and 18 is connected between terminals 22 and 23 and the winding 13 consisting of the windings 19 and 20 is connected between terminals 23 and 21, the resulting circuit for the windings being known as a delta connection. The electric means controlling the flow of current through the winding 11 consists of a pair of ignitron tubes 25 and 26 connected in anti-parallel relation with each other and having a series relation with the winding 11, being located between the sub-windings 14 and 15. Each ignitron tube includes an anode, a mercury cathode and a control electrode, the control electrode of tube 25 being indicated by numeral 27 and the control electrode for tube 26 being indicated by 28. Each ignitron tube has electrical connection with a firing valve which may comprise a thyratron 30 for ignitron tube 25 and a thyratron 31 for ignitron tube 26. The thyratrons 30 and 31 are controlled by a timing circuit, not shown, but which may be of conventional construction, the same having electrical connection with points A, B and C. Point A constitutes a common cathode point, the same having electrical connection with the cathodes of the thyratrons 30 and 31. Point B electrically connects with the screen grid 32 of thyratron 30 and in a similar manner point C electrically connects with the screen grid 33 of thyratron 31. The transformer 34 is necessary in order to obtain a common cathode point. The primary 35 of the transformer 34 is electrically connected at its respective ends to the anodes and cathodes respectively of the ignitrons 25 and 26. The transformer 24 is provided with two secondaries, one being indicated by 36 and the other by numeral 37. Secondary 36 electrically connects point B with the screen grid 32 and in a similar manner secondary 37 electrically connects point C with screen grid 33. The secondaries therefore have electrical connection in the grid circuits of the thyratrons and they function in a manner to counter any voltage which may appear between the common cathode point A and the cathodes of the thyratrons 30 and 31.

Thyratron 30 is provided with the usual anode and cathode and with a control grid 40 which is electrically connected to the secondary winding 42 of a transformer 44, the primary of this transformer having location in the phase shift control device shown in Figures 4 and 5 and which will be presently described in detail. In a similar manner thyratron 31 is provided with a control grid 43 having electrical connection with the secondary winding 45 of transformer 44. For maintaining ignitron tubes 25 and 26 and their respective thryratrons in the non-conductive state, points B and C are maintained negative with respect to point A. The action of the electric valves is such as to pass current only when their anodes are positive. When it is desired to fire ignitron 25, point B is made positive by the action of the timer and the potential on point C is maintained negative. Although point B and thus screen grid 32 of thyratron 30 is now positive with respect to its cathode, said tube will not fire until the control grid 40 is likewise made positive. By reason of the secondary windings 42 and 45 of transformer 44 an alternating current voltage will exist in the control grid circuit of the thyratrons 30 and 31. As regards grid 40, the same is made positive with respect to its cathode at a certain time in the half cycle for this particular phase as determined by the phase shift control device. Eventually through the joint action of the voltages on the screen grid 32 and control grid 40 the thyratron 30 will fire, rendering ignitron 25 conductive and passing a half cycle of current or a portion thereof which will flow from $L_2$ to $L_1$ through the winding 11. This unidirectional flow of current in winding 11 will develop a unidirectional voltage across winding 15 and a similar unidirectional voltage will be developed across the primary winding 46 of the transformer 47 since winding 46 is in parallel with 15. A voltage will be developed across primary winding 46 of the transformer 47 even when current is not flowing through the winding 15. This is so because all the primary windings 11, 12 and 13 are wound in the same direction on the same iron core and therefore a unidirectional voltage is developed across winding 15 whenever current flows through any of the primaries. Transformer 47 has a plurality of secondary windings located in the respective control circuits associated with windings 12 and 13, and which control circuits are energized in a manner as will now be described to cause a firing of one ignition of the pair as a result of flow of current through the lead ignitrons 25 or 26.

The control circuits for windings 12 and 13 are identical and therefore it will only be necessary to describe in detail one of said circuits for which purpose reference will be made to Figure 3 which illustrates on a somewhat larger scale the control circuit associated with winding 12, and which is interposed between the sub-windings 17 and 18. A pair of ignitron tubes 50 and 51 are located in the winding 12, being connected in anti-parallel relation, and the thyratron tubes 52 and 53 are associated with the ignitrons respectively. The screen grid circuit of thyratron 52 includes the secondary winding 54 of transformer 47 and a source of direct current potential such as the storage battery 55. The battery is connected as shown with its positive side toward the cathode of thyratron 52 so that the negative side of the battery has electrical connection with the screen grid 56. The screen grid circuit of thyratron 53 likewise includes the secondary winding 57 of transformer 47 and a source of direct current potential in the form of a storage battery 55 connected with its positive side toward the cathode of thyratron 53 and with its negative side in electrical connection with the screen grid 58. The control grid 60 of thyratron 52 is electrically connected with the secondary winding 61 which forms the control grid circuit of this thyratron. Also the control grid 62 of thyratron 53 is electrically connected to the secondary winding 63 which forms the control grid circuit of this thyratron. The secondaries 61 and 63 have a common primary, the structure comprising transformer 64 similar in all respects to transformer 44 and having location in the phase shift control device as shown in Figures 4 and 5.

Referring to winding 13 the ignitron tubes 65 and 66 are connected in anti-parallel relation and located between sub-windings 19 and 20. Thyratrons 67 and 68 are associated with the ignitrons respectively and each thyratron is provided with a screen grid circuit and a control grid circuit similar in all respects to that as shown and described with respect to Figure 3. The screen grid 70 of thyratron 67 is electrically connected to the secondary 71 of transformer 47 and to a source of direct current potential such as battery 55 connected as shown to maintain a negative potential on screen grid 70. The control grid 72 of thyratron 67 is electrically connected to the secondary winding 73 of transformer 74. Referring to thyratron 68 its screen grid 75 is electrically connected to the secondary winding 76 of transformer 47 and to the storage battery 55 with polarities as indicated to maintain a negative potential on the screen grid. The control grid 77 of thyratron 68 is electrically connected to secondary winding 78 of transformer 74. Transformer 74 has its primary located in the phase shift control device as shown in Figures 4 and 5 and is thus similar to transformers 64 and 44 previously described.

It has been explained that a unidirectional flow of current through primary winding 11, 12 or 13 will develop a unidirectional voltage across the primary 46 of transformer 47. A direct current voltage will also develop across the secondaries 54, 57, 71 and 76 of said transformer 47. Considering the direction of flow of the current through primary winding 11, it will be seen that this unidirectional voltage will have a polarity in secondaries 54 and 71 which will be opposite to that of the battery 55. However, in secondaries 57 and 76 the polarity of this unidirectional voltage is such as to supplement the battery 55 so that the control grids are held negative. The opposing or counter voltage in secondaries 54 and 71 is such as to render the screen grid of the thyratrons 52 and 67 positive so that the thyratrons will fire at a time in the half cycle of their respective phase as determined by the control grids 60 and 72. Said grids are under the control of the phase shift control device. According to the phase relation of the electromotive forces in the three phase supply line, a half cycle of current will next flow through winding 12, this half cycle being of the same polarity and displaced 120 degrees with respect to that flowing through winding 11. However flow of this half cycle through winding 12 may be delayed by the setting of the phase shift device since thyratron 52 will fire under these conditions, provided the potential on its screen grid and its control grid are both positive. When this takes place thyratron 52 becomes conductive to pass the half cycle of current which accordingly flows from $L_3$ to $L_2$. The next half cycle of current is caused to flow through winding 13, the pulse being passed by the ignitron 65 when the joint action of the voltages on the screen grid 70 and control grid 72 of thyratron 67 is such as to cause the thyratron to fire. Successive half cycles of current will flow through the windings according to the respective phases so that a unidirectional current will flow through each winding and all will be of the same polarity. Such operation will continue as long as the timer maintains a positive potential on point B. At the end of a preset interval of time the timer will bring point B to a negative potential again and this terminates the energization. The control circuit remains in a quiescent state and which may constitute the off-time between successive energization of the primary windings of transformer 10.

The unidirectional currents in flowing through the windings will induce an impulse of unidirectional current in the secondary winding 23 of the transformer 10 and which will be a pulsating current of increasing magnitude. The same may be used for welding.

The screen grid circuits of the firing valves 52, 53, 67 and 68 have a resistor 80 and a capacitor 81, best shown in Figure 3, connected in parallel with the secondary winding of the particular circuit. This capacitor and resistor is required in order to maintain the unidirectional voltage which is developed across the secondaries 54, 57, 71 and 76 when a pulse of current flows through primary windings 11, 12 or 13. There are times when the phase shift control device will delay the firing of the ignitrons and for this purpose the voltage is maintained since the capacitor 81 upon being charged will discharge through the resistor 80 and the time of discharge is predetermined so as to more than take care of the maximum delay in firing by the phase shift control device. The situation with respect to windings 12 and 13 is similar since a pulse of current flowing through a primary will induce a unidirectional voltage across 15 and so a unidirectional voltage is developed across the secondaries and which is maintained by the capacitor 81 and resistor 80 for the reason above given.

For the next energization of the primary windings the potential on point C is made positive and the action of the present control circuits for this energization is as follows: With point C positive it will be seen that the screen grid 43 of thyratron 31 becomes positive and thus this valve will fire except that the control grid 43 is negative and which is maintained in this state for a time as predetermined by the setting of the phase shifting control device. Presently the joint action of the voltages on both grids is such that the thyratron becomes conductive, thus rendering ignitron 26 conductive to pass a half cycle of current through primary winding 11, which, however, now flows through the winding $L_1$ to $L_2$ in a direction opposite to that of the first energization passed by ignitron 25. This flow of current through primary winding 11 will develop a unidirectional voltage in the primary 46 of transformer 47 and a similar voltage is accordingly induced in the secondary windings of said transformer 47. For this energization the unidirectional voltage induced in the secondary windings 57 and 76 has a polarity such as to counter the biasing potential of the battery 55 so that a positive potential is applied to the screen grids 58 and 75 of the thyratrons 53 and 68 respectively.

According to the phase relation of the electromotive forces in the alternating current supply the next half cycle of current is caused to flow through primary winding 12. However, thyratron 53 does not fire until the control grid 62 is also rendered positive and the conductivity of this thyratron fires ignitron 51 so that the half cycle of current or a portion thereof, depending on the setting of the phase shifting device, is passed through winding 12 from $L_2$ to $L_3$. Substantially similar operation takes place with respect to the circuit means associated with winding 13 and the next half cycle which follows 120 degrees later is caused to flow through this winding. The screen grid 75 having been rendered positive, it is only necessary for the control grid 77 to become positive so that thyratron 68 will fire and render ignitron 66 conductive. The half cycle current is accordingly passed from $L_3$ to $L_1$. Operation as above outlined will continue so that a succession of pulses of the same polarity will flow through the primary windings and eventually the timer will bring point C to a negative value, stopping the operation and ending another energization of transformer 10. As previously explained, this energization likewise induces in the secondary winding 23 a flow of unidirectional current constituting one impulse which may be described as a pulsating current of increasing magnitude. Also since the flow through the primary windings as regards this energization was opposite in direction to the flow for the first energization it will be understood that the polarity of the current impulse induced in the secondary 23 is opposite to that of the first impulse so that continued operation with the groups of ignitron tubes being fired alternately will result in the flow of a low frequency alternating current in the winding or work circuit 23.

From the foregoing description it will be seen that the control circuit of the invention provides two groups of ignitron tubes with firing circuits for each group. Since each pair of ignitrons is connected in back to back relation it will be seen that ignitrons 25, 50 and 65 constitute one group and that ignitrons 26, 51 and 66 constitute the second group. When the ignitrons of the first group, namely, 25, 50 and 65, are conductive, magnetizing current impulses will flow through the primary windings in an upward direction, considering the windings as illustrated in Figure 1, and when the second group of ignitrons, namely, 26, 51 and 66, are rendered conductive, the magnetizing current impulses will flow through said impulses in a downward direction. The thyratrons 30, 52 and 67 control the firing of the first group of ignitrons and which are maintained conductive for a period of time depending on the timer having electrical connection with points A, B and C. In a similar manner thyratrons 31, 53 and 68 will control the second group of ignitron tubes, likewise maintaining them conductive for a period of time as predetermined by the timer. In accordance with the invention, ignitrons 50 and 65 of the first group are caused to fire as a result of the passage of current by ignitron 25. This is caused by the unidirectional voltage developed across primary 46 which induces a similar voltage in the secondaries of this transformer 47. As regards secondaries 54 and 71, the polarity of the unidirectional voltage is such as to counter the biasing effect of the battery 55 and tubes 50 and 65 will fire in sequence although their firing may be delayed by the setting of the phase shift control device. The action of ignitrons 51 and 66 of the second group is similar since these ignitrons are caused to fire as a result of the passage of current by ignitron 26. In this case the flow of current through primary winding 11 is reversed and the unidirectional potential induced in the secondaries 57 and 76 of transformer 47 is such as to buck the biasing potential of the battery 55 so that ignitrons 51 and 66 fire in sequence.

The timer having electrical connection with points A, B and C may comprise a type of mechanism as disclosed in my copending application Serial No. 57,314, filed October 28, 1948, and entitled Electronic Timing Circuit. Such a timer will render the firing valves 30 and 31 conductive in synchronism with the sine wave of the supply voltage. Also such timer will operate to terminate the conductivity of the valves of this winding 11 at the end of the energizing period. By reason of the circuit means as described for the various firing valves associated with windings 12 and 13, said valves are rendered conductive in accordance with the conductivity of said leading thyratrons and therefore current pulses flow through windings 11, 12 and 13 in accordance with the phase relation of the electromotive forces in the windings. Due to the control grids of the firing valves it is possible to predetermine the firing point in relation to the sine wave of the supply voltage and thus the magnitude of the induced secondary current in winding 23 and its heat effect can be controlled. For this purpose the invention provides a novel type of phase shift control device shown in Figures 4 and 5 for phase shifting the voltage applied to the control grids with respect to the line voltage of the various phases. In Figure 4 the resistors $R_1$, $R_2$ and $R_3$ are connected in delta relation to the three phase supply line, it being observed that $R_1$ is connected across leads $L_1$—$L_2$, $R_2$ across leads $L_2$—$L_3$, with $R_3$ being connected across $L_3$—$L_1$. This delta connection of the resistors is the same as that of the primary windings. The transformer 44 having secondaries 42 and 45 includes a primary 82, and said primary is electrically connected across $L_1$—$L_2$ by means of the sliders 83 and 84. The transformer 64 including the secondaries 61 and 63 is provided with a primary winding 85 and this winding is connected across $L_2$—$L_3$ by means of the sliders 84 and 83. The transformer 74 having the secondary windings 73 and 78 is provided with a primary winding 87 connected across leads $L_3$—$L_1$ by means of sliders 86 and 83.

For describing the operation it will be assumed that the device is set as shown in Figure 4 and it will also be assumed that the positive half cycle for phase $L_1$—$L_2$ will be passed by ignitron 26, then its respective thyratron 31 will fire at the start of this half cycle since the voltage applied to the control grid 43 is in phase with the line voltage and in a similar manner the next positive half cycle for the phase $L_2$—$L_3$ will be passed by ignitron 51, resulting in its thyratron 53 firing at time $T_2$, or, in other words, at the start of this positive half cycle. Also for ignitron 66, which passes with the next positive half cycle $L_3$—$L_1$ its thyratron will fire at time $T_3$ which is at the start of this half cycle. By moving the sliders in a clockwise direction the firing of the thyratrons can be delayed and said valves can be caused to fire at a predetermined point in the half cycle, depending on the setting of the sliders up to a maximum delay of 120 degrees. To obtain this result the sliders are positioned as shown in Figure 5 and the delay in firing of the thyratrons is schematically illustrated in Figure 7. Referring to Figure 5, it will be seen that the position of the sliders 83 and 84 is such as to connect primary winding 82 across phase $L_2$—$L_3$ and also the position of sliders 84 and 86 is such as to connect primary winding 85 across phase $L_3$—$L_1$. Accordingly, as regards the positive half cycle for phase $L_1$—$L_2$, although the screen grid of thyratron 31 is positive at the start for passing this half cycle, nevertheless the control grid 43 does not become positive until 120 degrees later or substantially at the start of the positive half cycle for phase $L_2$—$L_3$. The current passed by ignitron 26 under these conditions is therefore a minimum. Thyraton 53 is also fired at a point 120 degrees late with respect to phase $L_2$—$L_3$, or at a time $T_3$, which represents the start of the next phase and for said next phase, namely, $L_3$—$L_1$, thyratron 68 is caused to fire 120 degrees late or at a time $T_4$ which represents the start of the second positive half cycle for the first phase, namely $L_1$—$L_2$. The phase shift device of the invention therefore operates on the principle of applying an alternating current to the control grids of the thyratrons through transformer action and which alternating current for the setting of the phase shift device as shown in Figure 4 will be in phase with the line voltage. As the sliders of the phase shift device are moved in a clockwise direction the voltage applied to the grids is phase shifted with respect to the line voltage and the firing of the thyratrons is accordingly delayed a predetermined extent with the maximum delay being occasioned by the setting of the phase shift device as shown in Figure 5.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a control circuit for a three-phase system wherein inductive windings comprising a first, second and third winding wound on a common iron core are connected in delta relation to a three-phase alternating current supply, a pair of electric discharge valves for each winding connected in anti-parallel relation and in series with their winding, said electric discharge valves providing control means for controlling flow of current through their respective winding, a firing valve electrically connected to each electric discharge valve, each firing valve operating to fire its discharge valve to render the same conductive when the firing valve is made conductive, said firing valves each having an anode, a cathode and a grid, an auxiliary transformer including a primary winding connected in shunt relation with the firing valves of the first winding to provide a common cathode terminal by center tapping said primary winding, a pair of secondary windings provided by said auxiliary transformer and having inductive relation with the primary winding thereof, each secondary winding being connected at one end with the grid of one of said firing valves for the first winding and at its other end forming a grid terminal, means applying control potentials to the common cathode terminal and to said grid terminals to thereby control the conductivity of the firing valves and thus the discharge valves of said first inductive winding, a control circuit associated with the grid of each firing valve of the second and third windings, and control means in each control circuit having inductive relation with said first winding and responsive to flow of current in the first winding, whereby the conductivity of the firing valves of the second and third windings and thus the discharge valves thereof are controlled according to that of the valves of the first winding.

2. In a control circuit for a three-phase system wherein inductive windings comprising a first, second and third winding wound on a common iron core are connected in delta relation to a three-phase alternating current supply, a pair of electric discharge valves for each winding connected in anti-parallel relation and in series with their winding, said electric discharge valves providing control means for controlling flow of current through their respective winding, a firing valve electrically connected to each electric discharge valve, each firing valve operating to fire its discharge valve to render the same conductive when the firing valve is made conductive, said firing valves each having an anode, a cathode, a control grid and a screen grid, means applying control potentials to the screen grids of the firing valves for the first winding to control the conductivity of said firing valves, the discharge valves thereof and flow of current through the first winding, inductive means in the screen grid circuit of each firing valve of the second and third windings, each said inductive means having inductive relation with the said first winding, whereby flow of current through said first winding controls the conductivity of the firing valves for the second and third windings by energization of the inductive means in their screen grid circuit, other inductive means in the control grid circuits of all the firing valves, a phase shift circuit, and said other inductive means having inductive relation with said phase shift circuit for phase shifting the voltage applied to the control grids with respect to the supply voltage.

3. In a control circuit for a three-phase system wherein inductive windings comprising first, second and third windings wound on a common iron core are connected in delta relation to a three-phase alternating current supply, a pair of electric discharge valves for each winding connected in anti-parallel relation and in series with their winding, said electric discharge valves providing control means for controllng flow of current through their respective winding, a firing valve electrically connected to each electric discharge valve, each firing valve operating to fire its discharge valve to render the same conductive when the firing valve is made conductive, said firing valves each having an anode, a cathode and a grid, means applying control potentials to the grids of the firing valves for the first winding to control the conductivity of said firing valves, the discharge valves thereof and flow of current through the first winding, means controlling the conductivity of the firing valves for the second and third windings in accordance with the conductivity of the firing valves of the first winding, said means including a negative biasing potential in the grid circuit of each firing valve for the second and third winding for maintaining said firing valves nonconductive, and inductive means in the grid circuit of each firing valve for the second and third winding having inductive relation with the first winding, whereby a unidirectional voltage is developed across each inductive means upon flow of current in the first winding and which has a polarity depending on the direction of flow to counter the biasing potential in certain grid circuits so that the firing valves thereof and the discharge valves are rendered conductive to pass current through their respective winding.

4. In a control circuit for a three-phase system as defined by claim 3, additionally including a resistor and a capacitor each connected in shunt relation across the inductive means in the grid circuit of each firing valve for the second and third winding, each combination of resistor and capacitor operating to maintain the unidirectional voltage developed across its inductive means, whereby said unidirectional voltage is present in the event of late firing of the firing valves thereof.

5. In a control circuit for a three-phase system wherein inductive windings comprising first, second and third windings wound on a common iron core are connected in delta relation to a three-phase alternating current supply, at least one electric discharge valve for each winding in series relation therewith for controlling flow of current through the winding, a firing valve of the grid control type electrically connected to each electric discharge valve, each firing valve operating to fire its discharge valve to render the same conductive when the firing valve is made conductive, means applying control potentials to the grid of the firing valve for the first winding to control the conductivity of said firing valve, the discharge valve thereof and flow of current through the first winding, a negative biasing potential in the grid circuit of each firing valve for the seond and third winding for maintaining said firing valves nonconductive, a control transformer having a primary winding in shunt relation with said first winding, a plurality of secondary windings provided by said control transformer, the said grid circuit of each firing valve for the second and third winding having one of said secondary windings in series circuit relation with the negative biasing potential thereof, whereby a unidrectional voltage is developed across each secondary winding upon flow of current in the first winding and which has a polarity depending on direction of flow to counter the biasing potential in certain grid circuits, and whereby the firing valve of said grid circuits and the discharge valves thereof are rendered conductive to pass current through their respective winding in a manner as determined by current flow in the first winding.

6. In a control circuit for a three-phase system wherein inductive windings comprising first, second and third windings wound on a common iron core are connected in delta relation to a three-phase alternating current supply, at least one electric discharge valve for each winding in series relation therewith for controlling flow of current through the winding, a firing valve of the grid control type electrically connected to each electric discharge valve, each firing valve operating to fire its discharge valve to render the same conductive when the firing valve is made conductive, means applying control potentials to the grid of the firing valve for the first winding to control the conductivity of said firing valve, the discharge valve thereof and flow of current through the first winding, a grid circuit associated with each firing valve for the second and third windings, and inductive means in each grid circuit having inductive relation with the first winding and providing a control element for the grid of its respective firing valve, whereby the conductivity of said firing valves for the second and third winding is controlled by flow of current through said first winding.

7. In a control circuit for an alternating current system, the combination with a source of alternating current, of an inductive device having windings electrically connected to said alternating current source, a pair of inversely connected electric discharge valves in series circuit relation with each winding, said electric discharge valves providing control means for controlling flow of current through their respective winding, a firing valve electrically connected to each electric discharge valve, each firing valve operating to fire its discharge valve to render the same conductive when the firing valve is made conductive, said firing valves each having an anode, a cathode, a control grid and a screen grid, means applying control potentials to the screen grids of the firing valves for one winding whereby to control the conductivity of said firing valves, the discharge valves thereof, and flow of current through said one winding, a negative biasing potential in the screen grid circuit of the other firing valves for maintaining said firing valves nonconductive, inductive means also in the screen grid circuit of the other firing valves having inductive relation with said first mentioned winding, whereby a unidirectional voltage is developed across each inductive means upon flow of current in the first mentioned winding and which has a polarity depending on the direction of flow to counter the biasing potential in certain screen grid circuits so that the firing valves thereof are rendered conductive to pass current through their respective winding, and other inductive means in the control grid circuit of all the firing valves having inductive relation with a phase shift circuit for phase shifting the voltage applied to the control grids with respect to the supply voltage.

JULIUS L. SOLOMON.

REFERENCES CITED

The following references are of record in the file of this patent:

UNITED STATES PATENTS

| Number | Name | Date |
| --- | --- | --- |
| 2,174,379 | Chambers | Sept. 26, 1939 |
| 2,175,841 | Kafka et al. | Oct. 10, 1939 |
| 2,200,077 | Dawson | May 7, 1940 |
| 2,319,524 | Undy | May 18, 1943 |
| 2,356,859 | Leathers et al. | Aug. 29, 1944 |
| 2,431,083 | Sciaky | Nov. 18, 1948 |
| 2,474,867 | Sciaky | July 5, 1949 |